US011485285B2

(12) United States Patent
Murao et al.

(10) Patent No.: US 11,485,285 B2
(45) Date of Patent: Nov. 1, 2022

(54) VEHICLE BODY MOTION INFORMING DEVICE

(71) Applicant: TOYOTA BOSHOKU KABUSHIKI KAISHA, Aichi (JP)

(72) Inventors: Koji Murao, Aichi-ken (JP); Richard Chung, Aichi-ken (JP); Atsuhiko Ito, Aichi-ken (JP); Hironori Matsubara, Aichi-ken (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 86 days.

(21) Appl. No.: 17/029,795

(22) Filed: Sep. 23, 2020

(65) Prior Publication Data

US 2021/0114520 A1 Apr. 22, 2021

(30) Foreign Application Priority Data

Oct. 18, 2019 (JP) .............................. JP2019-190743

(51) Int. Cl.
*B60Q 9/00* (2006.01)
*B60W 60/00* (2020.01)
(Continued)

(52) U.S. Cl.
CPC ................. *B60Q 9/00* (2013.01); *B60Q 3/54* (2017.02); *B60Q 3/80* (2017.02); *B60R 13/0243* (2013.01);
(Continued)

(58) Field of Classification Search
CPC .... B60Q 9/00; B60Q 3/54; B60Q 3/80; B60R 13/0243; B60R 2013/0287; B60R 13/02;
(Continued)

(56) References Cited

U.S. PATENT DOCUMENTS

2006/0052908 A1 3/2006 Matsumoto et al.
2014/0211498 A1* 7/2014 Cannon .................. B60Q 3/217
362/555

(Continued)

FOREIGN PATENT DOCUMENTS

DE 202019005292 U1 * 3/2020
DE 102019129406 B3 * 1/2021
JP 2006-142982 6/2006

*Primary Examiner* — Thomas Ingram
(74) *Attorney, Agent, or Firm* — Greenblum & Bernstein, P.L.C.

(57) ABSTRACT

A vehicle body motion informing device includes a vehicular interior part that configures an interior surface of a vehicular compartment of a vehicle, a lighting device mounted on a vehicular exterior side of the vehicular interior part and exiting light to a vehicular compartment, a control unit that receives an information signal relating to the motion of the vehicle body and controls the lighting device to exit light according to the information to inform the vehicle occupant of the motion of the vehicle body, and a surface member having semi-transmissivity and disposed to cover at least a lighting portion included in the vehicular interior part and a surrounding portion of the vehicular interior part. The lighting portion overlaps the lighting device and the light from the lighting device passes through the lighting portion to the vehicular compartment and the surrounding portion is near the lighting portion.

8 Claims, 6 Drawing Sheets

(51) Int. Cl.
   *B60R 13/02*          (2006.01)
   *B60W 50/14*          (2020.01)
   *B60Q 3/80*           (2017.01)
   *B60Q 3/54*           (2017.01)

(52) U.S. Cl.
   CPC .......... *B60W 50/14* (2013.01); *B60W 60/001* (2020.02); *B60W 2520/00* (2013.01)

(58) Field of Classification Search
   CPC ............... B60W 50/14; B60W 60/001; B60W 2520/00; B60K 2370/1529; B60K 2370/172; B60K 2370/334; B60K 2370/785; B60K 35/00; B60K 37/04
   See application file for complete search history.

(56) References Cited

U.S. PATENT DOCUMENTS

| | | | |
|---|---|---|---|
| 2019/0061655 A1* | 2/2019 | Son | ........................... B60Q 3/70 |
| 2019/0202290 A1* | 7/2019 | Havemann | ........... B60R 11/0235 |
| 2020/0307302 A1* | 10/2020 | Arai | ........................ B32B 21/06 |
| 2021/0114520 A1* | 4/2021 | Murao | .................. B60W 50/14 |

* cited by examiner

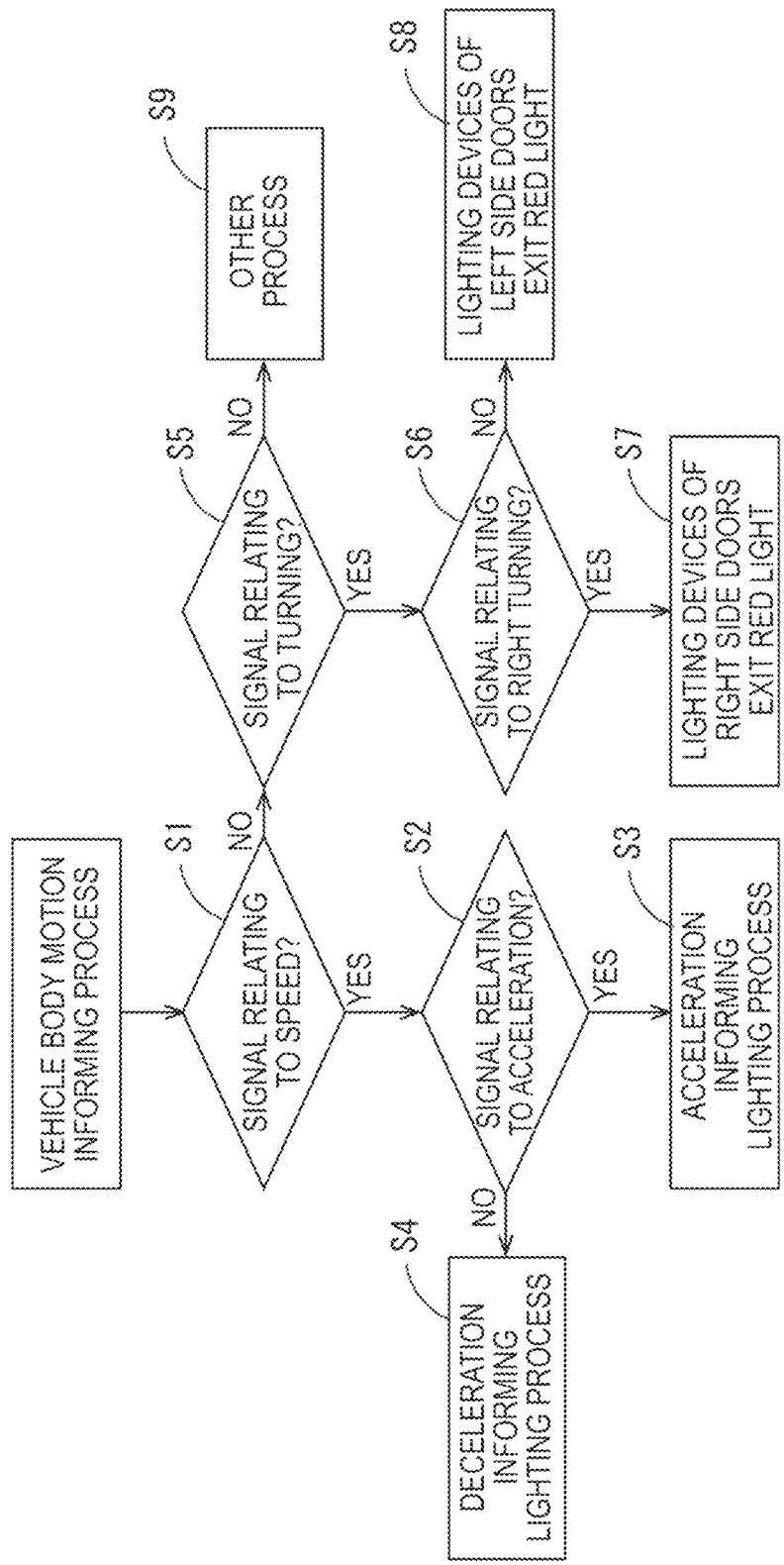

VEHICLE BODY MOTION INFORMING DEVICE

CROSS REFERENCE TO RELATED APPLICATION

This application claims priority from Japanese Patent Application No. 2019-190743 filed on Oct. 18, 2019. The entire contents of the priority application are incorporated herein by reference.

TECHNICAL FIELD

The technology described herein relates to a vehicle body motion informing device.

BACKGROUND

There has been an informing device (an informing system) for informing motions of a vehicle body to the vehicle occupants. Such an informing device informs the motions of the vehicle body by displaying an image on a display device mounted in an instrument panel or a head-up display. For example, various kinds of sensors such as an acceleration sensor and a wheel speed sensor are mounted in the vehicle body. Based on the detection results of the sensors, the informing device is configured to visualize the motions of the vehicle body such as pitching, rolling, yawing, a cornering force, and a force acting on the tires with arrows of different lengths or display an actual image of the tire turning angle. Thus, such an informing device displays current motions of the vehicle body that presently occur.

Recently, a vehicle where a driving support system is installed and a vehicle where a partial driving automation system is installed have been practically used and automated driving technology of a vehicle has been developed. In such a vehicle, a vehicle body may be moved with no relation to an occupant's intention (particularly, a driver's intention). Therefore, the motion of the vehicle is required to be informed to the passenger at an earlier timing. In the above vehicle motion informing device, a relatively small image is displayed to inform that the motion will be caused. Therefore, occurrence of the motion may not be surely informed to the occupant. Further, in the above vehicle motion informing device, the display device mounted in the instrument panel may deteriorate the internal design of the compartment and increase a cost.

SUMMARY

The technology described herein was made in view of the above circumstances. An objective of the technology described herein is to provide a vehicle body motion informing device that informs vehicle motions of an occupant appropriately with a simple method without deteriorating an internal design of a vehicle compartment.

A vehicle body motion informing device according to the present technology is a vehicle body motion informing device mounted in a vehicle and informing a vehicle occupant of a motion of a vehicle body of the vehicle. The vehicle body motion informing device includes a vehicular interior part that configures an interior surface of a vehicular compartment of the vehicle, a lighting device mounted on a vehicular exterior side of the vehicular interior part and exiting light to the vehicular compartment, a control unit that receives an information signal relating to the motion of the vehicle body and controls the lighting device to exit light according to the information to inform the vehicle occupant of the motion of the vehicle body, and a surface member having semi-transmissivity and disposed to cover at least a lighting portion included in the vehicular interior part and a surrounding portion of the vehicular interior part. The lighting portion overlaps the lighting device and the light from the lighting device passes through the lighting portion to the vehicular compartment and the surrounding portion is near the lighting portion.

BRIEF DESCRIPTION OF THE DRAWINGS

FIG. 6 is a flowchart illustrating a body motion informing process performed by the body motion informing device.

DETAILED DESCRIPTION

One embodiment of the present technology will be described in detail with reference to the drawings. The present technology is not limited to the embodiments described below but may be achieved in various modes with variations and improvements based on the knowledges of those having skills in the art.

Figure 1:
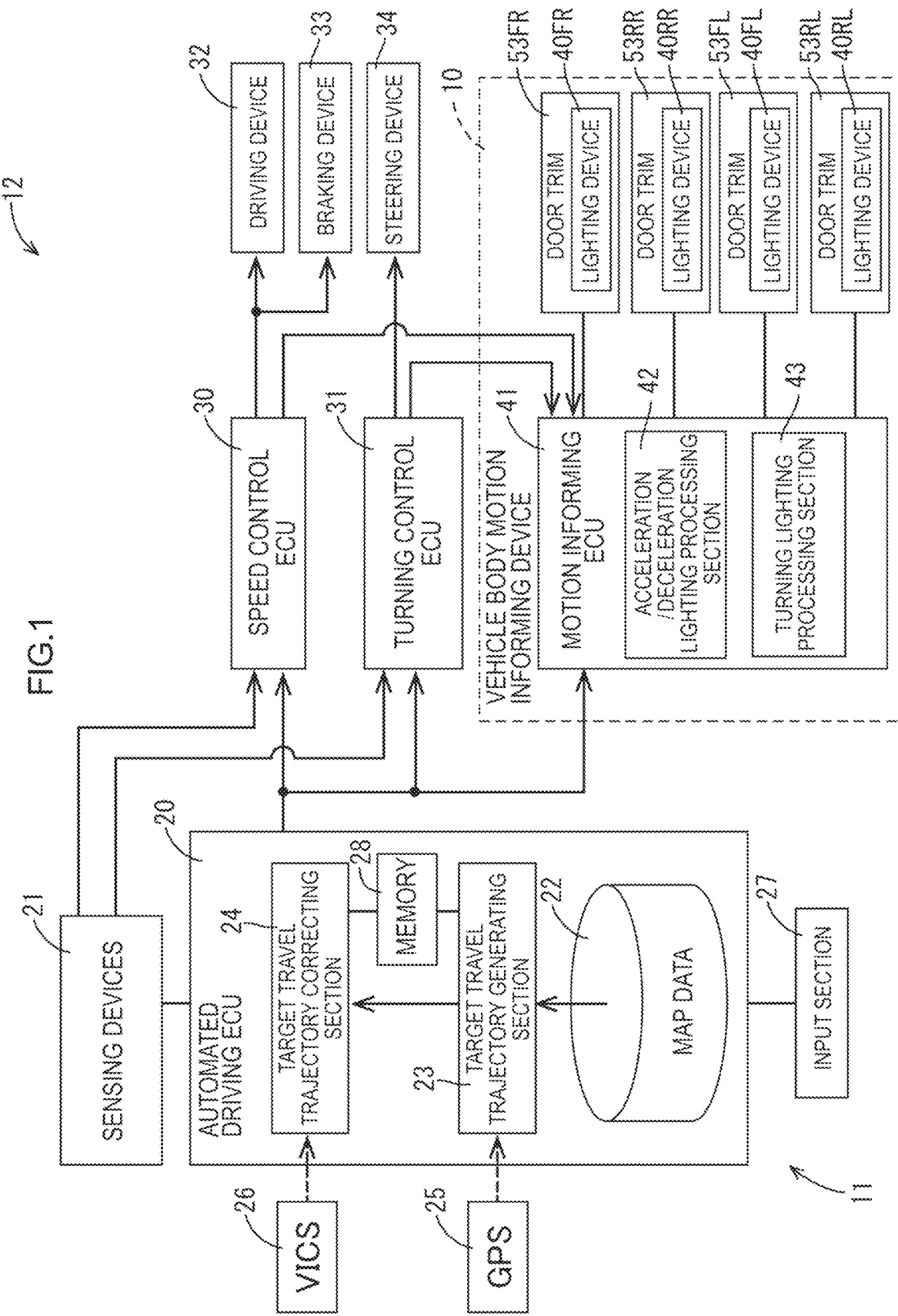
FIG. 1 is a block diagram generally illustrating devices mounted in a vehicle including a vehicle body motion informing device according to an embodiment of the technology described herein.

A vehicle body motion informing device 10 in the embodiment is installed in a vehicle 12 including an automated driving system 11. FIG. 1 is a block diagram illustrating general configurations of various devices included in the vehicle 12. The vehicle 12 includes the vehicle body motion informing device 10, the automated driving system 11, a speed control ECU 30, a turning control ECU 31, a driving device 32, a braking device 33, and a steering device 34. The vehicle body motion informing device 10 is configured to receive control data from the automated driving system 11 and inform the occupants that motions will be caused in a vehicle body. The automated driving system 11 will be described and the vehicle body motion informing device 10 may be one of the components included in the automated driving system 11.

Figure 2:
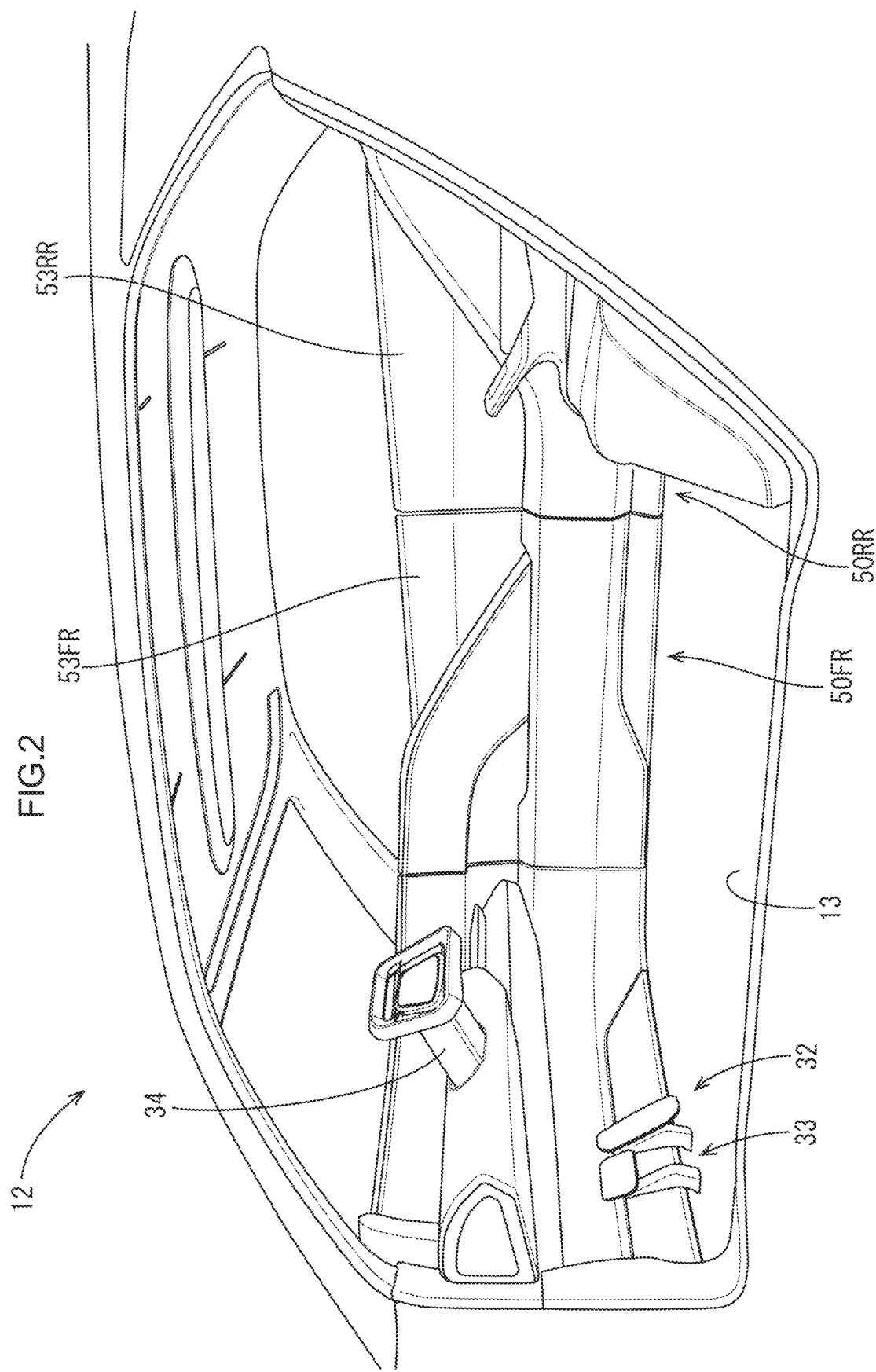
FIG. 2 is a perspective view illustrating a compartment of a vehicle where the vehicle body motion informing device of the embodiment is installed.

The automated driving system 11 in this embodiment is in level 4 that is defined by Society of Automotive Engineering (SAE). In level 4, the vehicle performs acceleration, braking, and steering to travel to a target point within a specific range including a highway road and requests a driver's assist only when needed. The automated driving system 11 may be in level 5. In the vehicle 12 including the automated driving system 11 in level 4 or level 5, arrangement of a driver's seat and a passenger seat can be changed freely. For example, positions of the seats on a floor 13 can be changed in the vehicular front-rear direction or the seats can be rotated to change the directions of the seats to face a lateral side or a rear side. FIG. 2 illustrates an interior of a compartment of the vehicle 12 and the driver's seat and the passenger seat are not illustrated in FIG. 2 such that the vehicle body motion informing device 10 can be seen.

As illustrated in FIG. 1, the automated driving system 11 includes an automated driving ECU 20, a sensing device 21, and an input section 27 that receives data from external devices. The automated driving ECU 20 includes a computer as a main component. The sensing device 21 includes radars and cameras mounted in the vehicle 12 to sense surrounding conditions of the vehicle 12. The automated driving ECU 20 includes map data 22, a target travel trajectory generating section (circuit) 23, and a target travel trajectory correcting section (circuit) 24. The map data 22 is stored in a ROM of the computer included in the automated driving ECU 20. The map data 22 may be updated with new data that is obtained from an external device when starting the vehicle 12. The target travel trajectory generating section 23 generates a travelling trajectory to the target point based on the map data 22 and the position coordinate received via a GPS 25 and stores the generated travelling trajectory in a memory 28. The target travel trajectory correcting section 24 may obtain traffic information received from an external device such as Vehicle Information and Communication System (VICS: registered trademark) 26 and correct the travelling trajectory. Examples of the traffic information include information regarding traffic jams and road constructions. Further, the target travel trajectory correcting section 24 may detect an obstacle based on image data obtained from the sensing device 21 and correct the travelling trajectory. The corrected travelling trajectory is stored in the memory 28.

The automated driving ECU 20 transmits the travelling trajectory stored in the memory 28, various kinds of information regarding the travelling trajectory such as speed limits, and information regarding the travel trajectory to the speed control ECU 30 and the turning control ECU 31. The sensing device 21 detects a distance (an inter-vehicle distance) to a preceding vehicle that is travelling in front of the vehicle 12. The speed control ECU 30 also receives information regarding the inter-vehicle distance from the sensing device 21. The speed control ECU 30 controls the driving device 32 such as an engine or a motor and the braking device 33 based on the information received from the automated driving ECU 20 and the information received from the sensing device 21 to control the travelling speed of the vehicle 12. The driving device 32 is configured to provide a driving force to the wheels and the braking device 33 is configured to provide a braking force to the vehicle 12. The turning control ECU 31 receives information regarding the position of the vehicle within a travel lane (a distance with respect to the white lines on the road). Based on the information received from the automated driving ECU 20 and the information received from the sensing device 21, the turning control ECU 31 controls a steering angle of the steering device 34 and a turning angle of the wheels such that the vehicle 12 travels along the target travel trajectory. If the vehicle is provided with a turning device that can turn the wheels independently from the steering device, the turning device may be directly controlled.

The vehicle 12 can be in a driver assistance mode instead of an automated driving mode in which control is performed without requiring driver's operation (an automated driving control). In the driver assistance mode, driver assistance control for assisting driver's driving operation is performed and for example, the vehicle can travel at a constant speed or follow the preceding vehicle with a constant distance. In the driver assistance control, for example, the speed control ECU 30 and the turning control ECU 31 do not receive the information from the automated driving ECU 20 and control the travel speed and the turning angle of the wheels based on the information from the sensing device 21 such that the vehicle 12 travels according to the surrounding environment.

As described before, since the automated driving control and the driver assistance control can be performed in the vehicle 12, the vehicle body may be motioned with no relation to the driver's intention. For example, the vehicle body squats when the vehicle 12 accelerates at the time of starting, the vehicle body pitches when the vehicle 12 decelerates with the braking device 33, and the vehicle body rolls or yaws when the vehicle 12 travels around a curve or turns right or left. Namely, when the automated driving control or the driver assistance control is performed, the vehicle body may be motioned without the driver's operation. Therefore, the occupants' (including the driver) preparation for the motion of the vehicle body is delayed. The vehicle 12 includes the vehicle body motion informing device 10 and informs the occupant that the vehicle body will be motioned at earliest timing as possible or previously.

Figure 3:
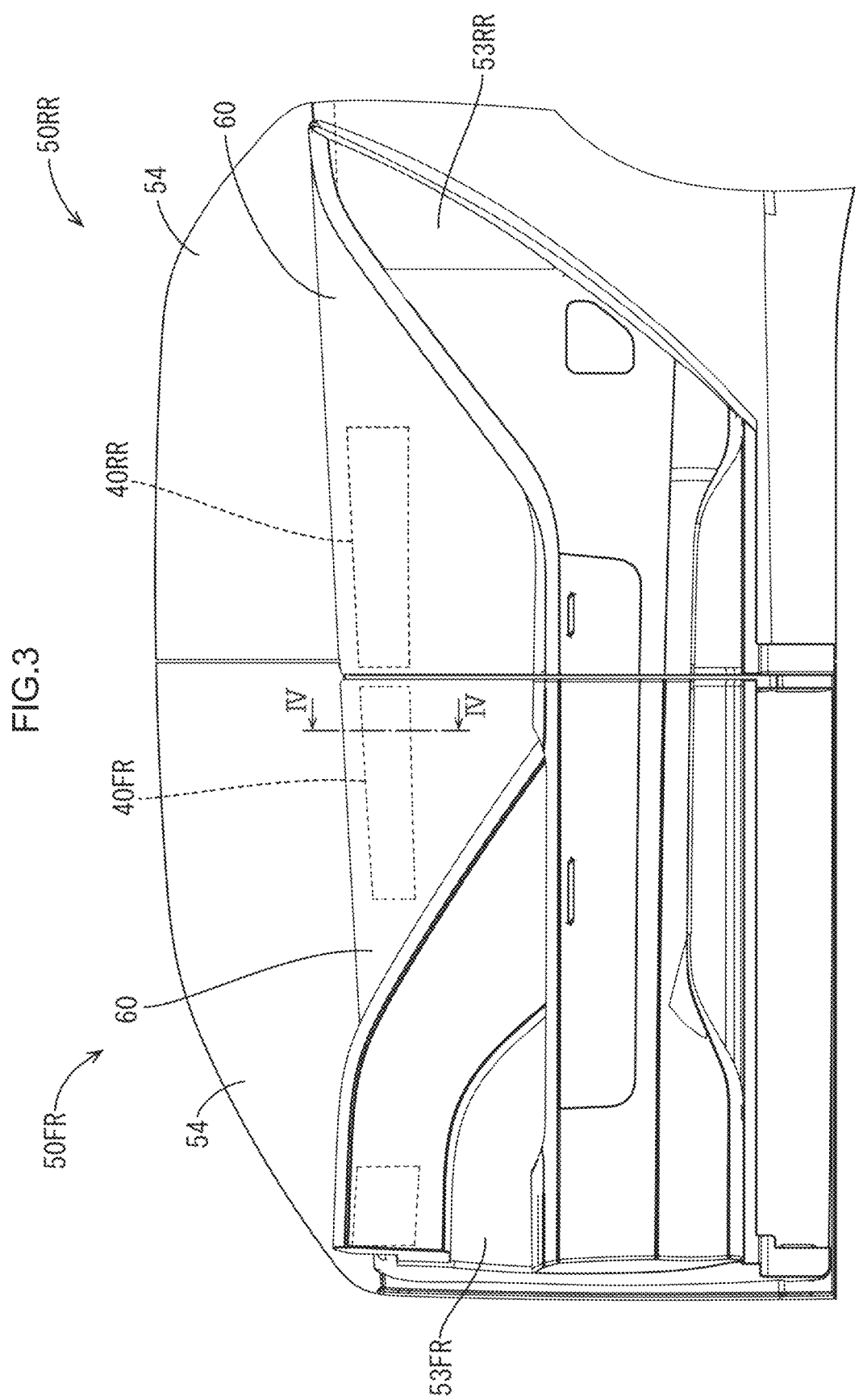
FIG. 3 is an elevation view of door trims including lighting devices of the vehicle body motion informing device.

The vehicle body motion informing device 10 in this embodiment will be described in detail. As illustrated in FIG. 1, the vehicle body motion informing device 10 includes lighting devices and a motion informing ECU 41 as main components. The lighting devices exit light toward the interior of the compartment. The motion informing ECU 41 is a control device that controls the lighting condition of each of the lighting devices. The lighting devices are mounted in right and left side doors of the vehicle 12. FIGS. 2 and 3 illustrate only two right side doors, particularly, a front right side door 50FR on a relatively front side and a rear right side door 50RR on a relatively rear side. The vehicle 12 includes a front left side door 50FL on a relatively rear side and a rear left side door 50RL on a relatively rear side. The front right side door 50FR, the rear right side door 50RR, the front left side door 50FL, and the rear left side door 50RL are held so as to be slidable. The front right side door 50FR and the front left side door 50FL are slid frontward and the rear right side door 50RR and the rear left side door 50RL are slid rearward to be opened.

The configurations of the side doors 50FR, 50RR, 50FL, 50RL are similar with respect to the configuration descried below and the configuration of the rear front side door 50RR will be described with reference to FIG. 4. The front right side door 50FR includes an outer panel 51 disposed on a vehicular exterior side, an inner panel 52 disposed on a vehicular interior side with respect to the outer panel 51, a door trim 53FR disposed on the vehicular interior side with respect to the inner panel 52, and a side window 54. The door trim 53 configures a vehicular compartment interior surface of the side door, that is, an interior design surface. The side window 54 is disposed between the inner panel 52 and the door trim 53 and extends upward.

As illustrated by broken lines in FIG. 3, a lighting device 40FR is arranged in a rear upper portion of a door trim 53FR of the front right side door 50FR and a lighting device 40RR is arranged in a front upper portion of a door trim 53RR of the rear right side door 50RR. A portion that is surrounded by the broken line in FIG. 3 is a lighting portion. Each of the lighting device 40FR of the front right side door 50FR and the lighting device 40RR of the rear right side door 50RR has an elongated shape extending in a vehicular front-rear direction. The lighting device 40FR and the lighting device 40RR are linearly arranged in the vehicular front-rear direction. The lighting device 40FR and the lighting device 40RR configure a continuous elongated lighting device as a whole.

The left side doors 50FL, 50RL also have such a configuration. Next, an arrangement configuration of the lighting devices 40FR, 40RR with respect to the side doors 50FR, 50RR will be described in detail. The configuration of a portion of the front right side door 50FR including the lighting device 40FR and the configuration of a portion of the rear right side door 50RR including the lighting device 40RR are substantially same. Therefore, in the following description, the front right side door 50FR will be described as one example. The left side doors 50FL, 50RL also have the same configuration in the portions including the lighting devices 40FL, 40RL, respectively.

Figure 4:
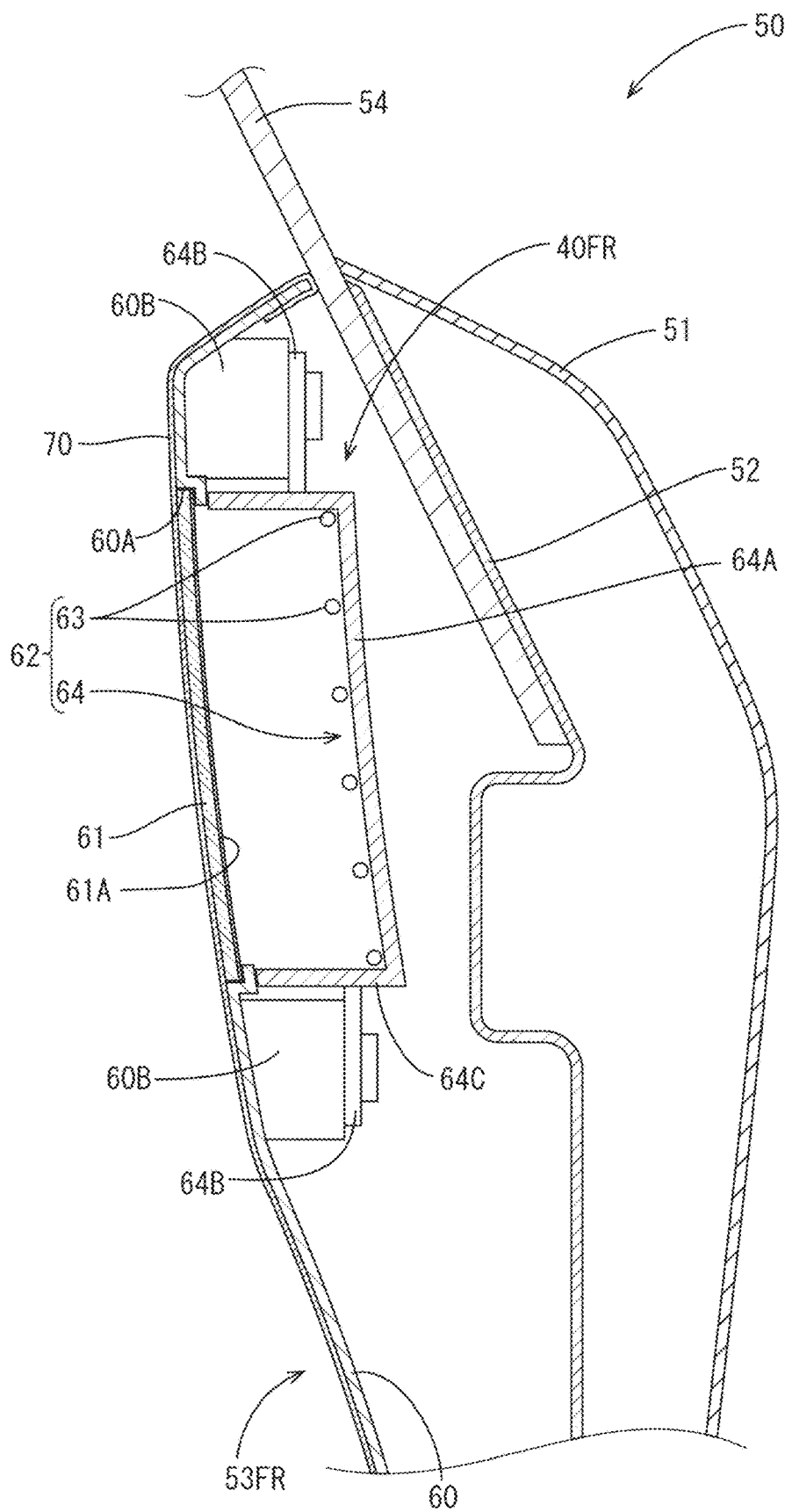
FIG. 4 is a cross-sectional view of a portion of the door trim where the lighting device is mounted taken along IV-IV line in FIG. 3.

As illustrated in FIG. 4, the lighting device 40FR is mounted on an upper board 60 of the door trim 53FR of the front right side door 50FR. The upper board 60 is made of synthetic resin material such as polypropylene. The material of the upper board 60 is not limited to the synthetic resin material but may be mixture of plant material and synthetic resin. The upper board 60 has a hole 60A as illustrated in FIG. 4. The hole 60A is rectangular and formed in each of the portions illustrated by the broken lines in FIG. 3. As illustrated in FIG. 4, the hole 60A has a step at a hole edge and the step is recessed toward the vehicular exterior side. A light transmission member 61 is fit in the hole 60A and placed on the step. The light transmission member 61 is made of synthetic resin that is highly light transmissive such as acrylic, PET, and polycarbonate. The light transmission member 61 is fixed to the hole edge or the step of the hole 60A with bonding such that the surfaces (front surfaces, vehicular interior surfaces) of the light transmission member 61 and the upper board 60 are flush with each other. A design sheet 61A is bonded to a rear surface (a vehicular exterior surface) of the light transmission member 61 to partially block light or reduce transmittance. The design sheet 61A is for providing design or modification to the light exiting the light transmission member 61. The design sheet 61A has light blocking portions that block light and light transmission portions that transmit light, for example. The design sheet 61A may have portions having low light transmittance and the light transmission portions that transmit light. The design sheet 61A may be bonded to the surface (the vehicular interior-side surface) of the light transmission member 61 and disposed between the light transmission member 61 and a surface member 70, which will be described later.

As illustrated in FIG. 4, a light exit section 62 is fixed to a rear surface (a vehicular exterior side surface) of the upper board 60 so as to be opposite the light transmission member 61. The light exit section 62 includes a housing member 64 and LEDs 63 that are light sources and arranged in the housing member 64. The lighting device 40FR includes the light exit section 62, the design sheet 61A, and the light transmission member 61. The LEDs 63 can be switched on and off and when the LEDs 63 are lighted, illuminance can be altered in a stepwise manner within a range from relatively high illuminance (bright) to relatively low illuminance (dark). The LED 63 includes a red LED element emitting red light, a green LED element emitting green light, and a blue LED element emitting blue light. The mixture ratio of the colors of emitting light can be adjusted to change the color of light emitted by the LED 63. The housing member 64 is a box-shaped member that is open toward the vehicular interior side and is arranged on a vehicular exterior side with respect to the door trim 53. The housing member 64 includes a bottom 64A of the box shape that is disposed on the vehicular exterior side with respect to the opening. The LEDs 63 are disposed on the bottom 64A. The housing member 64 is made of synthetic resin and does not transmit and reflect light. The bottom 64A and the opening have a substantially same area as that of the lighting portion that is illustrated by the broken line in FIG. 3.

The housing member 64 includes side walls 64C extending from four sides of the bottom 64A and includes flanges 64B extending upward and downward from the side walls on the upper and lower sides, respectively. The upper board 60 includes mounting portions 60B on the rear surface (the vehicular exterior-side surface) of the upper board 60. The mounting portions 60B are projections on the rear surface of the upper board 60. The flanges 64B of the housing member 64 are fixed to the respective mounting portions 60B. Accordingly, the housing member 64 covers the light transmission member 61 from the vehicular exterior side. According to such a configuration, the light emitted by the LEDs 63 passes through the light transmission member 61 to the vehicular compartment (the vehicular interior side). Most of the light rays that transmit through the light transmission member 61 from the vehicular compartment (the outside of the housing member 64) and enter the housing member 64 are absorbed by the housing member 64.

Figure 5:
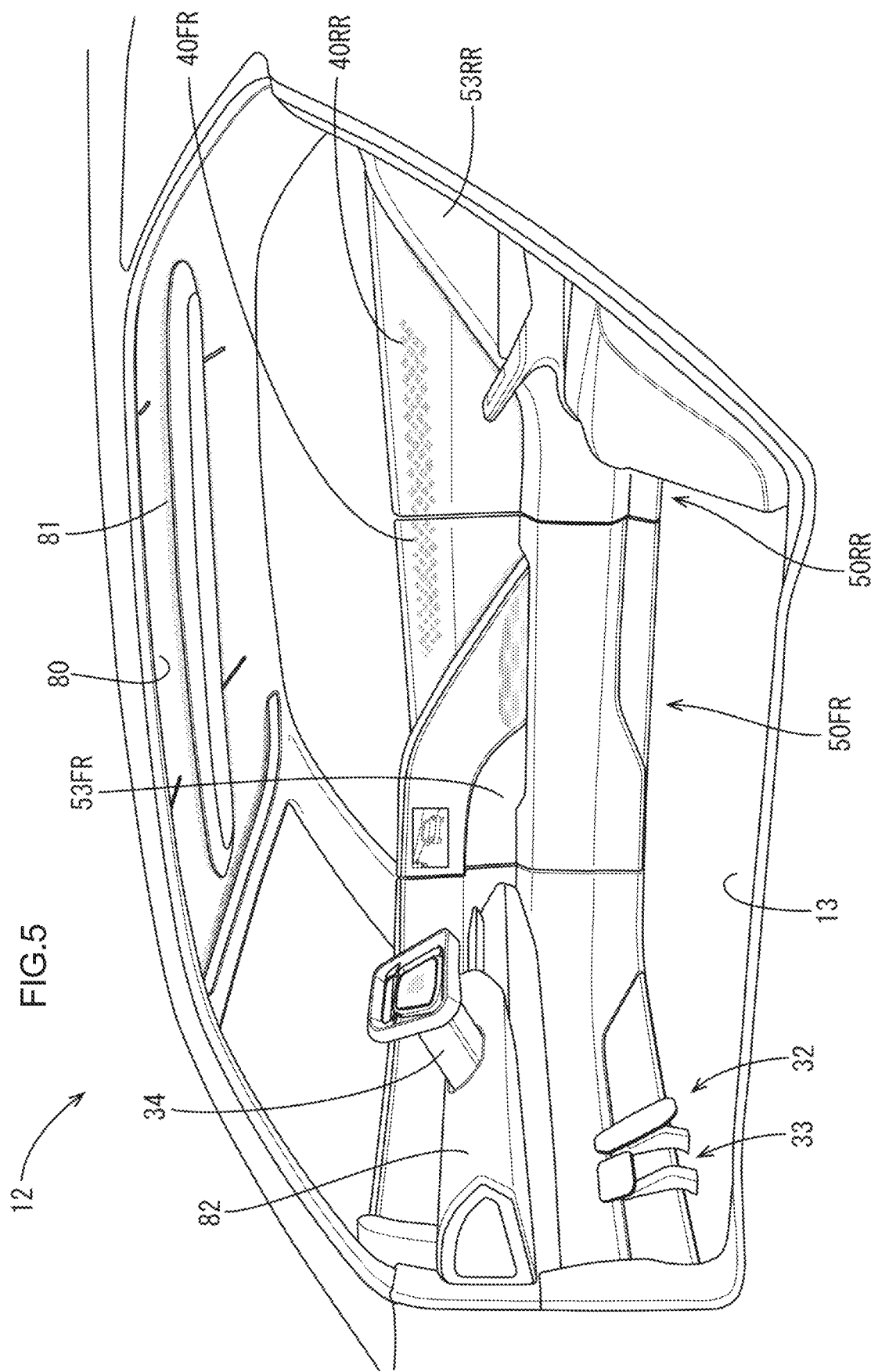
FIG. 5 is a perspective view illustrating that the lighting devices of the vehicle body motion informing device are lighted.

As illustrated in FIG. 4, the vehicular interior-side surface of the upper board 60 is covered with the surface member 70. The light transmission member 61, which is the lighting portion of the lighting device 40FR, and at least a surrounding portion that is a portion of the door trim around the light transmission member 61 are collectively covered with the surface member 70. The light transmission member 61 and a whole upper board 60 are covered with the surface member 70. The surface member 70 is made of a thin film resin having semi-transmissivity (light transmittance of 50% or less). With such a configuration, as illustrated in FIGS. 2 and 4, a border between the hole edge of the hole 60A of the upper board 60 and the light transmission member 61 is less likely to be recognized from the vehicular interior side (the compartment side) when the LEDs 63 are not turned on. When the LEDs 63 are turned on, as illustrated in FIG. 5, the light rays that have passed through the light transmission portions of the design sheet 61A pass through the light transmission member 61 and the surface member 70 and exit to the vehicular interior side (the vehicular compartment).

The motion informing ECU 41 controls each of the lighting devices 40FR, 40RR, 40FL, 40RL of the four side doors 50FR, 50RR, 50FL, 50RL having the above configuration to inform the vehicle's occupants of the motion of the vehicle body. The motion informing ECU 41 can control each of the lighting devices 40FR, 40RR, 40FL, 40RL independently to turn on and off each of the lighting devices 40FR, 40RR, 40FL, 40RL independently. As illustrated in FIG. 1, the motion informing ECU 41 includes an acceleration/deceleration lighting processing section 42 and a turning lighting processing section 43. The acceleration/deceleration lighting processing section 42 controls the lighting device to be turned on when the motion is caused in the vehicular body according to acceleration or deceleration of the vehicle. The turning lighting processing section 43 controls the lighting device to be turned on when the motion is caused in the vehicle body according to turning of the vehicle.

A vehicle body motion informing process performed by the vehicle body motion informing device 10 will be described. In the automated driving control process, the automated driving ECU 20 obtains a current position of the vehicle 12 and a vehicle body motion point where a motion will be caused according to the acceleration, deceleration or turning of the vehicle based on the driving trajectory stored in the memory 28 and obtains a distance between the vehicle body motion point and the current position. When determining that the distance reaches a predetermined distance, the automated driving ECU 20 transmits a vehicle body motion signal indicating that a motion will be caused to the motion informing ECU 41 of the vehicle body motion informing device 10 and the vehicle body motion informing process is started.

As illustrated in FIG. 6, in the vehicle body motion informing process, the motion informing ECU 41 determines whether the vehicle body motion signal is a signal relating to speed or not (S1). When determining that the vehicle body motion signal is a signal relating to speed (S1:YES), the motion informing ECU 41 determines whether the vehicle body motion signal is a signal relating to acceleration or not (S2). When determining that the vehicle body motion signal is a signal relating to acceleration (S2:YES), the motion informing ECU 41 performs an acceleration informing lighting process (S3).

In the acceleration informing lighting process (S3), the motion informing ECU 41 controls the lighting devices 40FR, 40RR, 40FL, 40RL of the door trims 53FR, 53RR, 53FL, 53RL of all the side doors 50FR, 50RR, 50FL, 50RL to exit blue light.

In step S2, when determining that the vehicle body motion signal is not a signal relating to acceleration (S2:NO), the motion informing ECU 41 determines that the vehicle body motion signal is a signal relating to deceleration or stopping and performs a deceleration informing lighting process (S4).

In the deceleration informing lighting process (S4), the motion informing ECU 41 controls the lighting devices 40FR, 40RR, 40FL, 40RL of the door trims 53FR, 53RR, 53FL, 53RL of all the side doors 50FR, 50RR, 50FL, 50RL to exit orange light.

In step S1, when determining that the vehicle body motion signal is not a signal relating to speed (S1:NO), the motion informing ECU 41 determines whether the vehicle body motion signal is a signal relating to turning or not (S5). When determining that the vehicle body motion signal is a signal relating to turning (S5:YES), the motion informing ECU 41 determines whether the vehicle body motion signal is a signal relating to right turning or not (S6).

When determining that the vehicle body motion signal is a signal relating to right turning (S6:YES), the motion informing ECU 41 controls the lighting devices 40FR and 40RR of the door trims 53FR and 53RR of the right side doors 50FR and 50RR to exit red light (S7). On the other hand, when determining that the vehicle body motion signal is not a signal relating to right turning (S6:NO), the motion informing ECU 41 determines that the vehicle body motion signal is a signal relating to left turning and controls the lighting devices 40FL and 40RL of the door trims 53FL and 53RL of the left side doors 50FL and 50RL to exit red light (S8). The processes of steps S7 and S8 correspond to a turning informing lighting process.

In step S5, when determining that the vehicle body motion signal is not a signal relating to turning (S5:NO), the motion informing ECU 41 performs other process as appropriate in step S9. After the acceleration informing lighting process of S3, the turning informing lighting processes of S7 and S8, and other process of S9, the process returns to the automated driving control process (a main routine).

Operations and effects of the vehicular body motion informing process will be described. While the vehicle 12 is under the automated driving control, the acceleration/deceleration lighting processing section 42 can previously obtain a point where the vehicle 12 starts travelling or starts to accelerate and controls the lighting devices 40FR, 40RR, 40FL, 40RL of the door trims 53FR, 53RR, 53FL, 53RL of all the side doors 50FR, 50RR, 50FL, 50RL to exit blue light (S3) a predefined time before starting. While the vehicle 12 is under the automated driving control, the acceleration/deceleration lighting processing section 42 can previously obtain a point where the vehicle 12 stops or starts to decelerate and controls the lighting devices 40FR, 40RR, 40FL, 40RL of the door trims 53FR, 53RR, 53FL, 53RL of all the side doors 50FR, 50RR, 50FL, 50RL to exit orange light (S4) a predefined time before starting deceleration.

While the vehicle 12 is under the automated driving control, the turning lighting processing section 43 can previously obtain a point where the vehicle 12 makes a sharp turn, turns right or left, and joins another road and controls the lighting devices 40FR and 40RR of the door trims 53FR and 53RR of the right side doors 50FR and 50RR or the lighting devices 40FL and 40RL of the door trims 53FL and 53RL of the left side doors 50FL and 50RL to exit red light (S7, S8) a predefined time before turning. The lighting devices that are to exit light are included in the side doors that are arranged in the direction in which the vehicle 12 turns and travels.

As described above, the vehicle body motion informing device 10 is controlled in cooperation with the automated driving system 11 such that the vehicle body motion informing device 10 can previously inform the vehicle's occupants that a motion of the vehicle body will be caused. This improves comfortability in riding of the vehicle.

While the vehicle 12 is under the driver assistance control, the vehicle body motion informing process is started when the acceleration/deceleration lighting processing section 42 determines that the target acceleration/deceleration speed is different from the current speed or when the turning lighting processing section 43 determines that the target travel trajectory changes. Specifically, when determining that the target acceleration/deceleration speed is greatly different from the current speed, the acceleration/deceleration lighting processing section 42 controls the lighting devices 40FR, 40RR, 40FL, 40RL of the door trims 53FR, 53RR, 53FL, 53RL of all the side doors 50 to exit blue light or orange light.

When determining that the curvature of the driving lane where the vehicle 12 is to travel is great and the target travel trajectory greatly changes, the turning lighting processing section 43 controls the lighting devices 40FR and 40RR of the door trims 53FR and 53RR of the right side doors 50FR and 50RR or the lighting devices 40FL and 40RL of the door trims 53FL and 53RL of the left side doors 50FL and 50RL to exit red light. The lighting devices that are to exit light are included in the side doors that are arranged in the direction in which the vehicle 12 turns and travels. Therefore, the vehicle body motion informing device 10 can inform the vehicle's occupants that a motion of the vehicle body will be caused at early timing while the vehicle 12 is under the driver assistance control.

As described before, in the vehicle body motion informing device 10, the lighting devices 40FR, 40RR, 40FL, 40RL are disposed on the rear surface (the vehicular exterior-side surface) of the door trims 53FR, 53RR, 53FL, 53RL (a vehicular interior part), respectively. The door trims 53FR, 53RR, 53FL, 53RL are covered with the surface member 70 having semi-transmissivity (semi-light transmissivity) in at least the portions thereof corresponding to the lighting portions (the light transmission member 61) of the lighting devices 40FR, 40RR, 40FL, 40RL and the surrounding portions (the entire area of the upper board 60). According to such a configuration, when the vehicle body motion informing device 10 is not being operated, that is, when the lighting devices 40FR, 40RR, 40FL, 40RL do not exit light, the lighting devices 40FR, 40RR, 40FL, 40RL are not seen from the vehicular interior side and this improves vehicular interior design. Thus, the vehicle body motion informing device 10 can inform the vehicle's occupants that a motion will be caused while improving the vehicular interior design.

The vehicle body motion informing device 10 can inform the vehicle's occupants that a motion will be caused in the vehicle body by turning on the lighting device when or before the vehicle starts to accelerate, decelerate, or turn. The surface member 70 is made of material that has light blocking properties such that the light source of the lighting device cannot be seen from the vehicular interior side but through which the light from the lighting device passes to the vehicular interior side.

According to such a configuration, when the vehicle body motion informing device 10 is not being operated, that is, when the lighting devices 40FR, 40RR, 40FL, 40RL do not exit light, the lighting devices 40FR, 40RR, 40FL, 40RL are not seen from the vehicular interior side and this improves vehicular interior design. Thus, the vehicle body motion informing device 10 can inform the vehicle's occupants that a motion will be caused while improving the vehicular interior design. In such a vehicle body motion informing device 10, the vehicular interior part where the lighting device is disposed is not particularly limited to the door trim but may be any parts that are covered with the surface member. The lighting device may be preferably disposed on the parts that can be easily seen by the vehicle's occupants such as a ceiling member and an interior part near the instrument panel.

The vehicle body motion informing device 10 is installed in a vehicle including the automated driving system and controls the lighting device to exit light when the automated driving system is operated.

The automated driving system is not necessarily limited to the system that performs fully autonomous driving (level 5) but may be the system that performs conditional autonomous driving (level 3, level 4) or the system that performs driver assistance driving (level 1, level 2). In the vehicle including the driver assistance system, the driver assistance system can know the vehicle body will motion based on an operation command transmitted to the driving device such as an engine or a motor and the braking device or based on an operation command transmitted to the steering device. In such a case, the lighting device is controlled to exit light and the vehicle's occupants are informed that a motion will be caused at early timing.

In the vehicle including the automated driving system in which the fully autonomous driving can be performed all the time or under specific conditions, the informing operation similar to that of the driver assistance system can be performed. Further, the automated driving system can know the point of a curve or a temporary stop sign and know where the vehicle body will motion due to turning, acceleration, or deceleration. Therefore, the vehicle body motion informing device 10 can previously inform the vehicle's occupants that the motion will be caused before the vehicle body actually starts to motion.

The control unit of the vehicle body motion informing device 10 controls the lighting device to exit light when the vehicle accelerates or decelerates.

The vehicle body motion informing device 10 can inform the vehicle's occupants that the motion will be caused when or before the vehicle body squats at the time of starting or accelerating. Also, the vehicle body motion informing device 10 can inform the vehicle's occupants that the motion will be caused when or before the vehicle body pitches at the time of decelerating.

The control unit of the vehicle body motion informing device 10 controls the lighting device to exit light when the vehicle turns.

The vehicle body motion informing device 10 can inform the vehicle's occupants that the motion will be caused when or before the vehicle body rolls (rolling) or yaws (yawing) at the time of turning.

Other Embodiments

The lighting device included in the vehicle body motion informing device 10 is not particularly limited to the lighting devices 40FR, 40RR, 40FL, 40RL that are arranged on the respective door trims 53FR, 53RR, 53FL, 53RL but may be a lighting device 81 arranged on a roof panel 80 as illustrated in FIG. 5. The lighting device may be arranged on a vehicular interior part 82 where the steering device 34 is arranged and that is mounted in a vehicular front inner side portion and extends in the left-right direction. The lighting devices 40FR, 40RR, 40FL, 40RL arranged on the respective door trims 53FR, 53RR, 53FL, 53RL are most preferable for informing the vehicle's occupants since they are present at the occupants' eye level.

In the above embodiment, the surface member 70 is made of a resin thin film. However, the material of the surface member 70 is not limited to the resin thin film but may be material that has light blocking properties such that the LEDs 63 of the lighting device cannot be seen from the vehicular interior side but through which the light from the LEDs 63 passes to the vehicular interior side. Examples of the material include natural fiber such as kenaf and the natural fibers are stacked on each other to form a sheet of the surface member 70.

In the above embodiment, in the acceleration informing lighting process (S3) and the deceleration informing lighting process (S4), the motion informing ECU 41 controls the lighting devices 40FR, 40RR, 40FL, 40RL of the door trims 53FR, 53RR, 53FL, 53RL of all the side doors 50FR, 50RR, 50FL, 50RL to exit light. However, the motion informing ECU 41 may control predetermined ones of the lighting devices 40FR, 40RR, 40FL, 40RL to exit light according to the motion that will be caused. Similarly, in the turning informing lighting processes (S7, S8), the motion informing ECU 41 controls the lighting devices 40FR and 40RR of the door trims 53FR and 53RR or the lighting devices 40FL and 40RL of the door trims 53FL and 53RL to exit light according to the direction in which the vehicle turns and motions. However, the motion informing ECU 41 may control one of the lighting devices on the front side or the rear side to exit light.

The invention claimed is:

1. A vehicle body motion informing device mounted in a vehicle and informing a vehicle occupant of a motion of a vehicle body of the vehicle, the vehicle body motion informing device comprising:
   a vehicular interior part that configures an interior surface of a vehicular compartment of the vehicle;
   a lighting device mounted on a vehicular exterior side of the vehicular interior part and exiting light to the vehicular compartment;
   a control unit that receives an information signal relating to the motion of the vehicle body and controls the lighting device to exit light according to the information to inform the vehicle occupant of the motion of the vehicle body; and a surface member having semi-transmissivity and disposed to cover at least a lighting portion included in the vehicular interior part and a surrounding portion of the vehicular interior part, the lighting portion overlapping the lighting device and through which the light from the lighting device passes to the vehicular compartment and the surrounding portion being near the lighting portion, wherein the vehicular interior part includes a hole, the lighting device is disposed opposite the hole and on a vehicular exterior side with respect to the vehicular interior part and includes a light source, a housing in which the light source is arranged, and a light transmissive member that is disposed to cover the hole from a vehicular interior side and corresponds to the lighting portion.

2. The vehicle body motion informing device according to claim 1, wherein the surface member is disposed to cover the light transmissive member and a vehicular interior-side surface of the vehicular interior part including the surrounding portion.

3. The vehicle body motion informing device according to claim 1, wherein the surface member has light transmittance of 50% or less.

4. The vehicle body motion informing device according to claim 3, wherein the surface member is a thin resin film.

5. The vehicle body motion informing device according to claim 1, wherein the lighting device further includes a design sheet disposed on a vehicular exterior-side surface of the light transmissive member and having light transmissive portions through which light passes and light blocking portions that block light.

6. The vehicle body motion informing device according to claim 1, wherein the housing of the lighting device has a rectangular box shape elongated in a vehicular front-rear direction and having an opening that opens toward the vehicular interior side and is communicated with the hole of the vehicular interior part, and the housing includes a bottom plate that is opposite the light transmissive member and side walls extending from sides of the bottom plate to the vehicular interior part.

7. The vehicle body motion informing device according to claim 1, wherein the surface member extends continuously between the vehicular interior part and the light transmissive member.

8. The vehicle body motion informing device according to claim 1, wherein a vehicular interior-side surface of the vehicular interior part including the surrounding portion and a vehicular interior-side surface of the light transmissive member are flush with each other, and the surface member extends continuously over the vehicular interior-side surfaces of the vehicular interior part including the surrounding portion and the light transmissive member.

\* \* \* \* \*